(12) United States Patent
Park

(10) Patent No.: US 12,657,612 B2
(45) Date of Patent: Jun. 16, 2026

(54) SUPPLIER VIRTUOUS CYCLE EVALUATION METHOD BASED ON ON-SITE VERIFICATION

(71) Applicant: Moon Kwan Park, Seoul (KR)

(72) Inventor: Moon Kwan Park, Seoul (KR)

( * ) Notice: Subject to any disclaimer, the term of this patent is extended or adjusted under 35 U.S.C. 154(b) by 42 days.

(21) Appl. No.: 18/684,363

(22) PCT Filed: Aug. 16, 2022

(86) PCT No.: PCT/KR2022/012159
§ 371 (c)(1),
(2) Date: Feb. 16, 2024

(87) PCT Pub. No.: WO2023/022459
PCT Pub. Date: Feb. 23, 2023

(65) Prior Publication Data
US 2024/0273585 A1 Aug. 15, 2024

(30) Foreign Application Priority Data

Aug. 16, 2021 (KR) ........................ 10-2021-0107758
Aug. 12, 2022 (KR) ........................ 10-2022-0101409

(51) Int. Cl.
G06Q 30/0282 (2023.01)
G06Q 30/0217 (2023.01)

(52) U.S. Cl.
CPC ..... G06Q 30/0282 (2013.01); G06Q 30/0217 (2013.01)

(58) Field of Classification Search
CPC ........... G06Q 30/0282; G06Q 30/0217; G06Q 30/0207; G06Q 10/0639; G06Q 10/10;
(Continued)

(56) References Cited

U.S. PATENT DOCUMENTS

| | | | | |
|---|---|---|---|---|
| 11,935,024 | B1 * | 3/2024 | Cziraky-Stanley | .... G06Q 40/06 |
| 2012/0246004 | A1 * | 9/2012 | Book | ...................... G06Q 30/02 |
| | | | | 705/347 |

(Continued)

FOREIGN PATENT DOCUMENTS

| | | | |
|---|---|---|---|
| KR | 10-2007-0107964 A | 11/2007 |
| KR | 10-1188900 B1 | 10/2012 |

(Continued)

OTHER PUBLICATIONS

The Ultimate Guide to Geofencing & Beaconing for CX. Qualtrics. (n.d.). 2021. https://www.qualtrics.com/articles/customer-experience/geofencing-beaconing/ (Year: 2021).*

(Continued)

*Primary Examiner* — Shannon S Campbell
*Assistant Examiner* — Manal A. Alsamiri
(74) *Attorney, Agent, or Firm* — KORUS Patent, LLC; Seong Il Jeong

(57) ABSTRACT

A supplier virtuous cycle evaluation method based on on-site verification is disclosed. The method comprises the steps of: a mobile application, executed on a mobile terminal of a user, acquiring store information including a store location from a store that supplies a tangible or intangible product; the mobile application granting the user evaluation authority over the corresponding store if a location of the mobile terminal matches the store location and the corresponding store is a pre-registered store; the mobile application uploading, to a management server, the result of evaluation of the store according to evaluation by the user who has been granted the evaluation authority; the management server paying and managing a reward to the user before or after the evaluation of the store by the user who has been granted the evaluation authority; and the management server providing (Continued)

a store promotion service for disclosing the uploaded result of the evaluation of the store online.

1 Claim, 6 Drawing Sheets

(58) Field of Classification Search
CPC  G06Q 30/0241; G01S 19/24; G06K 7/10297; G06K 19/06028
See application file for complete search history.

(56) References Cited

U.S. PATENT DOCUMENTS

| 2014/0095281 A1 * | 4/2014 | Weiss ................. G06Q 30/0207 |
| | | 705/14.13 |
| 2016/0180365 A1 * | 6/2016 | Shi ..................... G06Q 30/0217 |
| | | 705/14.19 |
| 2020/0034801 A1 * | 1/2020 | Maxwell .............. G06Q 20/047 |

FOREIGN PATENT DOCUMENTS

| KR | 10-1350735 B1 | 1/2014 |
| KR | 10-2014-0123195 A | 10/2014 |
| KR | 10-2194521 B1 | 12/2020 |

OTHER PUBLICATIONS

International Search Report dated Nov. 22, 2022 in International Application No. PCT/KR2022/012159.

* cited by examiner

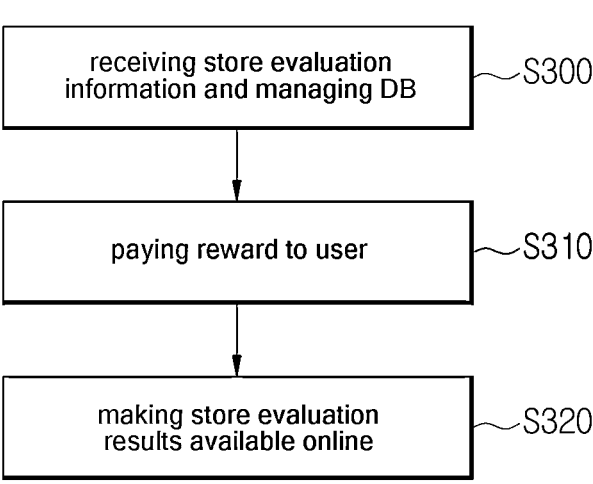

receiving store evaluation
information and managing DB          ~S300 paying reward to user          ~S310 making store evaluation
results available online          ~S320

FIG. 6

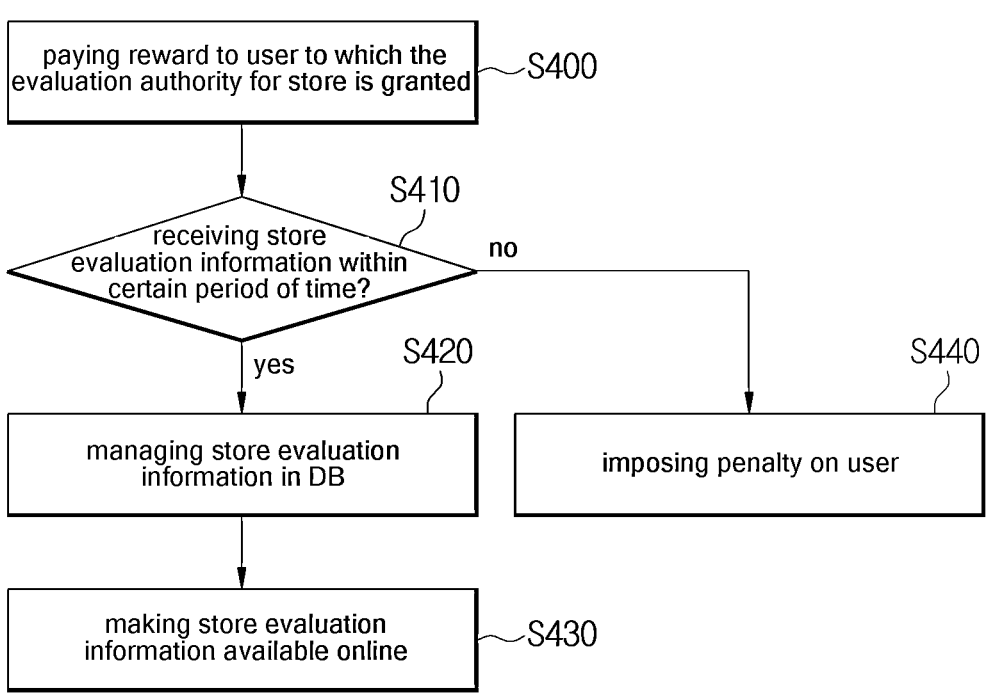

paying reward to user to which the
evaluation authority for store is granted          ~S400 receiving store
evaluation information within
certain period of time?          S410 no yes managing store evaluation
information in DB          S420 imposing penalty on user          S440 making store evaluation
information available online          ~S430

SUPPLIER VIRTUOUS CYCLE EVALUATION METHOD BASED ON ON-SITE VERIFICATION

CROSS-REFERENCE TO RELATED APPLICATIONS

This application is the U.S. national stage application of International Patent Application No. PCT/KR2022/012159, filed Aug. 16, 2022, which claims the benefit under 35 U.S.C. § 119 of Korean Application Nos. 10-2021-0107758, filed Aug. 16, 2021; and 10-2022-0101409, filed Aug. 12, 2022; the disclosures of each of which are incorporated herein by reference in their entirety.

TECHNICAL FIELD

The present disclosure relates to a technology of providing a service using a mobile application and, more particularly, to a technology of providing a service for the mutual benefit between consumers and suppliers.

BACKGROUND ART

Korean Patent No. 10-20304627 discloses a reward system for encouraging visits to offline stores. This system prioritizes a reward in each offline store, provides a certain amount of rewards when a user visits an offline store and authenticates a purchase with the purchase receipt received from a purchase of a product, and allows the rewards to be used at various purchasing locations, thereby encouraging users to visit offline stores and helping to improve the store's sales.

DISCLOSURE

Technical Problem

An objective of the present disclosure is to provide a method that allows users (consumers) to voluntarily evaluate stores (suppliers) and accordingly promote stores in a virtuous cycle.

Technical Solution

A supplier virtuous cycle evaluation method based on on-site verification according to an exemplary aspect may include a step in which a mobile application executed on a user's mobile terminal acquires a store information, including a store location, in a store that supplies tangible or intangible products, a step in which the mobile application grants the user the right to evaluate the corresponding store when the location of the mobile terminal matches the store location and the corresponding store is a pre-registered store, a step in which the mobile application uploads to a management server store evaluation results by the user to which the evaluation authority is granted, a step in which the management server pays and manages rewards to the user before or after the evaluation of the user to which the evaluation authority is granted, and a step in which the management server provides a store promotion service that makes the uploaded store evaluation results available online.

The supplier virtuous cycle evaluation method based on on-site verification may further include a step in which the mobile application receives a choice between an immediate evaluation and a scheduled evaluation from the user to which the evaluation authority is granted, a step in which the mobile application provides a user interface for store evaluation to the user when the user selects the immediate evaluation, and a step in which the mobile application provides a user interface for store evaluation to the user only within a certain period of time when the user selects the scheduled evaluation. When the scheduled evaluation is selected, the reward payment step may pay rewards before the store evaluation.

The supplier virtuous cycle evaluation method based on on-site verification may further include a step in which the management server imposes a penalty on the user when the store evaluation results are not uploaded within a certain period of time when the scheduled evaluation is selected.

Advantageous Effects

The present disclosure may create effects of securing the reliability of users' store evaluations, enabling an active virtuous cycle of evaluation and promotion by encouraging users to participate in the evaluations, and securing reliability in store evaluations.

DESCRIPTION OF DRAWINGS

FIG. 1 is a block diagram of a supplier virtuous cycle evaluation method based on on-site verification according to an exemplary embodiment.

FIG. 5 is a flowchart performed in a management server according to an exemplary embodiment.

FIG. 6 is a flowchart performed in a management server according to another exemplary embodiment.

MODE FOR INVENTION

The above-described and additional aspects of the present disclosure will become more apparent through the preferred exemplary embodiments described with reference to the accompanying drawings. Hereinafter, the present disclosure will be described in detail so that those skilled in the art may easily understand and reproduce the present disclosure through such exemplary embodiments.

Figure 1:
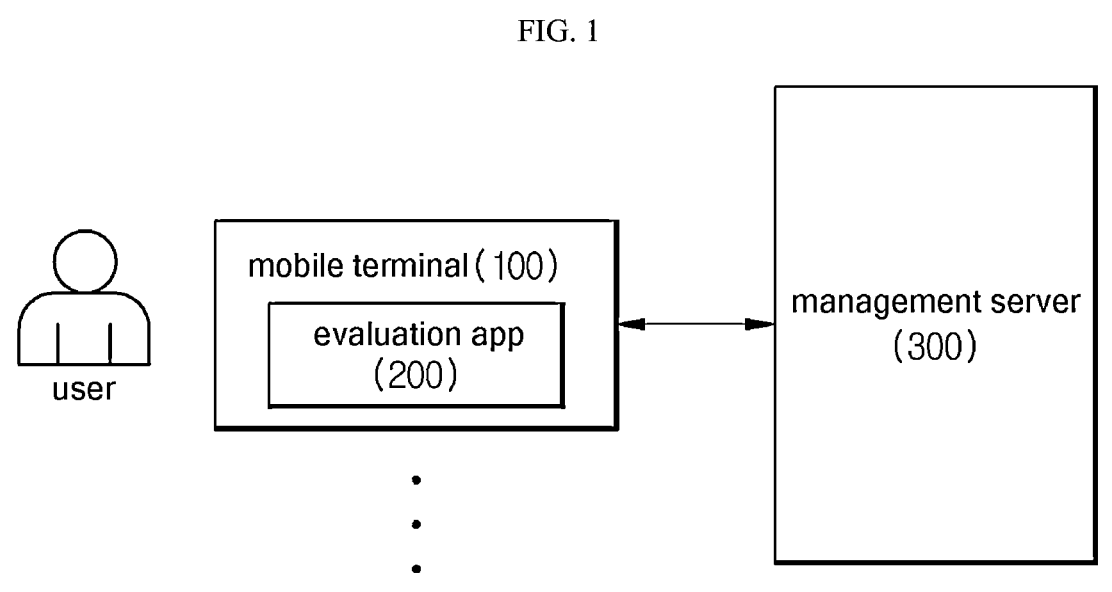

FIG. 1 is a block diagram of a supplier virtuous cycle evaluation method based on on-site verification according to an exemplary embodiment. A mobile terminal 100 may be a communicable computing device carried by a user (a consumer), and may include a smartphone as an example. A mobile application 200 (hereinafter, referred to as an 'evaluation app') for the supplier evaluation based on on-site verification may be installed and executed in the mobile terminal 100. Herein The user may refer to a consumer who purchases a product by visiting a store (supplier) that sells (supplies) tangible or intangible products.

A management server 300 may be a server system that includes one or more computing devices for servers and may be operated under various operating systems, including but not limited to, Windows-based operating systems, MacOS, Java, Unix, or Linux. Such a management server 300 may communicate data with the mobile terminal 100, more specifically store in a database and manage store evaluation results performed by users through interworking with the evaluation apps 200, and provide a store promotion service that makes available online to users via the web or an app the store evaluation results and promotes a store.

Figure 2:
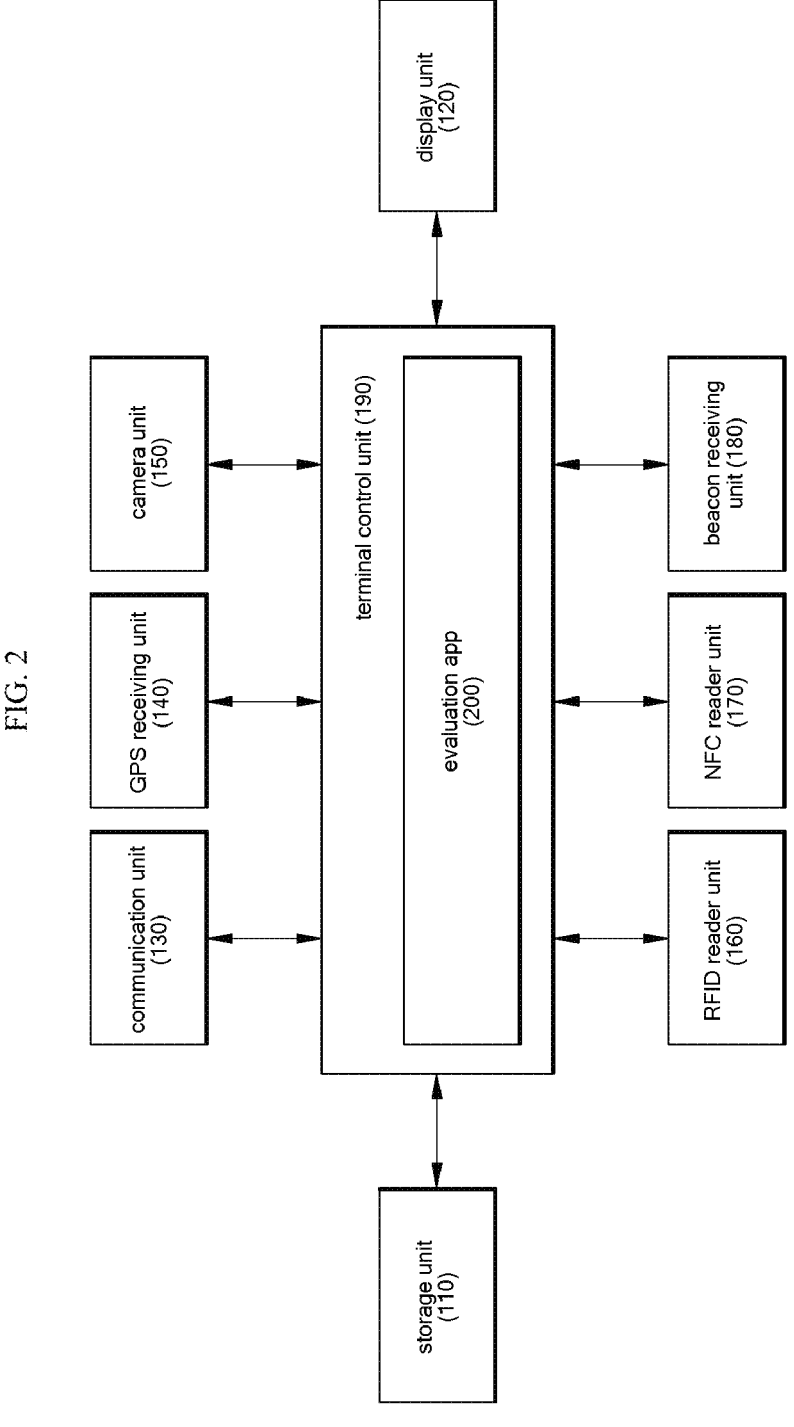
FIG. 2 is a block diagram of a mobile terminal according to an exemplary embodiment.

FIG. 2 is a block diagram of a mobile terminal according to an exemplary embodiment. The mobile terminal 100 may include at least one of a storage unit 110, a display unit 120, a communication unit 130, a GPS receiving unit 140, a camera unit 150, an RFID reader unit 160, an NFC reader unit 170, a beacon receiving unit 180, and a terminal control unit 190. The storage unit 110 may store commands, data, programs and the like for operating the mobile terminal 100, and the evaluation app 200 may also be recorded and managed in the form of a program code. The display unit 120 may provide a screen that allows a user to use the evaluation app 200, and may be not only an output screen but also a touch screen capable of receiving an input from the user. The communication unit 130 may be a communication module for transmitting and receiving data to and from the management server 300, and the GPS receiving unit 140 may be a receiver that receives a GPS signal from a global positioning system (GPS) satellite, which is already well known.

The camera unit 150, the RFID reader unit 160, the NFC reader unit 170, and the beacon receiving unit 180 may be also well known in themselves and may be used in the present disclosure as a means for acquiring the store information from barcodes such as QR (Quick Response) codes, RFID tags, NFC tags, or beacons provided in stores. That is, the store information may be recorded in a QR code, a RFID (Radio Frequency Identification) tag, or a NFC (Near Field Communication) tag and the like provided in the store and may be acquired through the camera unit 150, the RFID reader unit 160, or the NFC reader unit 170, and wireless transmission signals of a beacon installed in the store may be received through the beacon receiving unit 180, and the store information may be acquired from the received signal. The above is just exemplary, and the store information may be acquired through other known means or new means that may appear in the future.

The terminal control unit 190 may control overall the mobile terminal 100 and may include one or more processors. A processor of the terminal control unit 190 may load and execute the evaluation app 200 stored in the storage unit 110, so that the user may use the evaluation app 200, evaluate the store visited in person using the evaluation app 200, upload the evaluation information to the management server 300, and check the evaluation information for each store available on the online platform of the management server 300.

Figure 3:
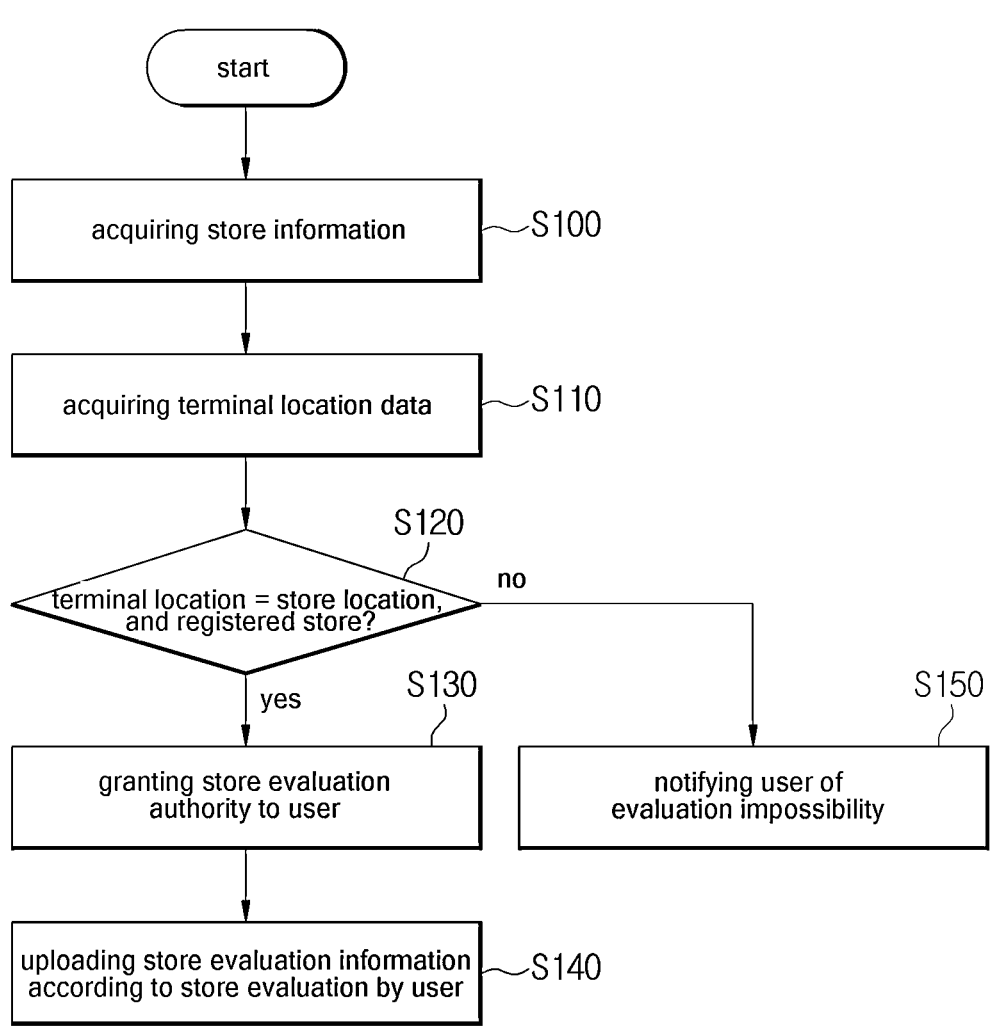
FIGS. 3 and 4 are flowcharts performed in a mobile terminal according to an exemplary embodiment.
Figure 4:
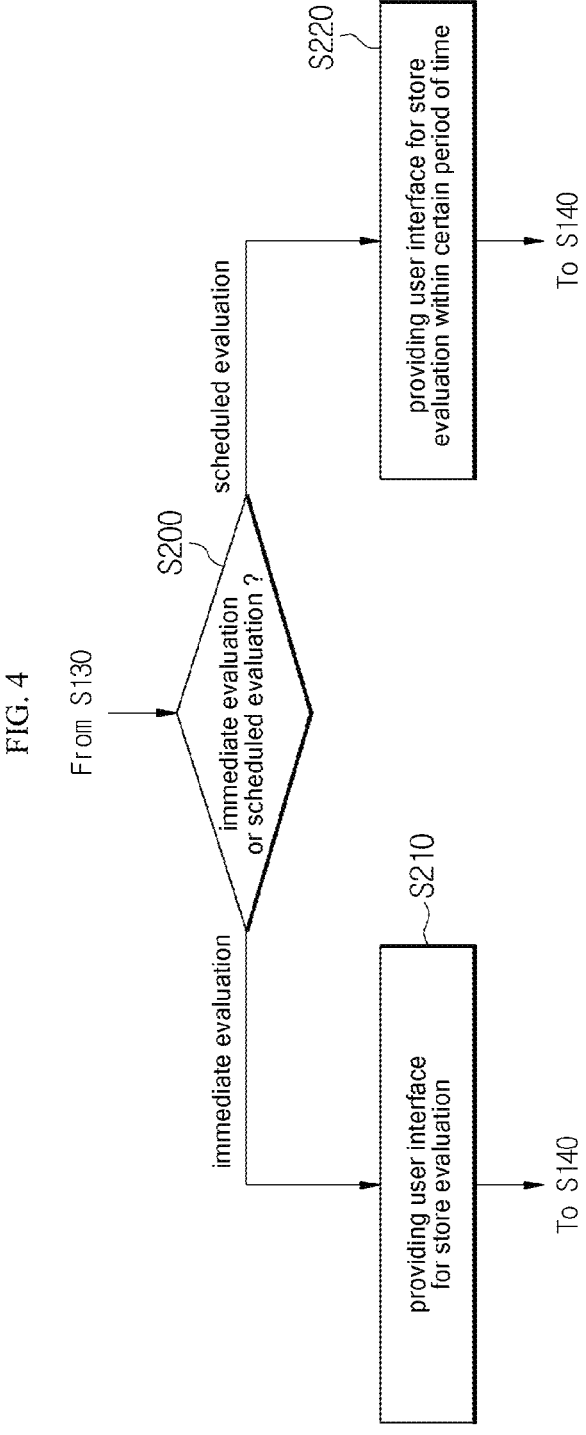

Hereinafter, exemplary embodiments of a supplier virtuous cycle evaluation method based on on-site verification will be described with reference to FIGS. 3 to 6. FIGS. 3 and 4 are flowcharts performed by the evaluation app 200 executed on the mobile terminal, and FIG. 5 is a flowchart performed in the management server. However, this may not mean that the evaluation app 200 and the management server 300 perform the steps independently and at least some steps may be performed in conjunction with each other.

FIG. 3 will be described. The evaluation app 200 may acquire a store information using a hardware resource of the mobile terminal 100 (S100). In this case, the hardware resource to be used may be a camera unit 150, an RFID reader unit 160, an NFC reader unit 170, a beacon receiver 180, or something else. The store information may include store location data, and may also include store identification information such as a store name (a supplier name). The evaluation app 200 may also acquire location data of the mobile terminal 100 (S110). In this case, the hardware resource to be used may be the GPS receiver 140, but is not limited thereto. The step S110 may be a step that is subsequently performed after the step S100 is first performed, or a step before the step S100, or the steps S100 and S110 may be performed independently regardless of the order.

The evaluation app 200 may compare and check whether the store location identified through the store information in the step S100 matches the terminal location in the step S110 (S120). That is, it may compare and check whether the terminal location is within the store location. In this case, considering errors of the terminal location, it may be possible to compare and check whether the terminal location matches the store location within a predetermined error range. In addition, the evaluation app 200 may determine whether the corresponding store is a registered store in S120. In an exemplary embodiment, the management server 300 may manage information on registered stores in a database in advance and the evaluation app 200 may inquire the management server 300 using a store identification information in the store information about whether the store is a registered store and determine whether the store is registered or not.

In S120 when it is confirmed that the terminal location matches the store location and the user is located in the store and it is confirmed that the corresponding store is a registered store, the evaluation app 200 grants the user the evaluation authority for the corresponding store (S130). Accordingly, the user may proceed to evaluate the store visited on-site through the evaluation app 200 and the evaluation app 200 may upload to the management server 300 the store evaluation information acquired from the user's evaluation (S140). Meanwhile, in S120 when the terminal location is different from the store location or when it is confirmed that the corresponding store is not a registered store, the evaluation app 200 may notify the user that the evaluation is not possible (S150).

FIG. 4 will be described. FIG. 4 may be a procedure performed between S130 and S140 of FIG. 3. The evaluation app 200 may allow the user to which the evaluation authority is granted to select whether to do an immediate evaluation or a scheduled evaluation with respect to the store (S200), may provide a user interface for store evaluation to the user so that the user performs a store evaluation when the user selects the immediate evaluation (S210), or may grant the user a certain period of time from the time when the user is granted evaluation rights for the store evaluation when the user selects the scheduled evaluation and may provide a user interface for the store evaluation so that the user performs the store evaluation anytime when there is a user's request within the granted certain period of time (S220).

Meanwhile, as shown in FIG. 4, the user may not be able to choose between the immediate evaluation or the scheduled evaluation, but may be forced to choose one or the other without selection. That is, the user to which the evaluation authority is granted may have to immediately perform an evaluation or may only perform an evaluation within a given period of time.

FIG. 5 will be described. FIG. 5 may be performed in the case of the immediate evaluation described above. The management server 300 may receive the store evaluation information uploaded from the evaluation app 200 and may store and manage the received store evaluation information in a database (S300). The management server 300 may pay a reward to the user as compensation for the store evaluation, and pay the rewards to the user through the evaluation app 200 (S310). The rewards may be a coupon or point that can be used like cash in the corresponding store, but is not limited thereto. Also, the management server 300 may provide a store promotion service that makes available online to the users through a web page or an app the store evaluation information which is managed in a database (S320).

FIG. 6 will be described. FIG. 6 may be performed in the case of the scheduled evaluation described above. The management server 300 may pay rewards to the user to which the evaluation authority for a store is granted (S400). The rewards may be the same as described above. When the store evaluation information is received from the evaluation app 200 within the predetermined period granted to the user, the management server 300 may store and manage the received store evaluation information in a database (S410) (S420). Also, the management server 300 may provide a store promotion service that makes available online through a web page or an app the store evaluation information which is managed in the database (S430). Meanwhile, when the store evaluation information is not received within the predetermined period, that is, when the store evaluation information is not uploaded from the evaluation app 200, the management server 300 may impose a penalty on the user (S440). The penalty may be to restrict the user's ability to use the evaluation app 200, to downgrade the user's membership in the case of a membership system, or to reclaim the rewards paid. These penalties are exemplary, and the manner of the penalty is not particularly limited.

According to the above, it is possible to inhibit evaluation manipulation by malicious users who have not visited on-site since the store evaluation is performed only by users who are authenticated to visit the store, thereby increasing the reliability of the evaluation, and the voluntary participation of visitors and accordingly the promotion of the store may be achieved in a virtuous cycle.

Figure 7:
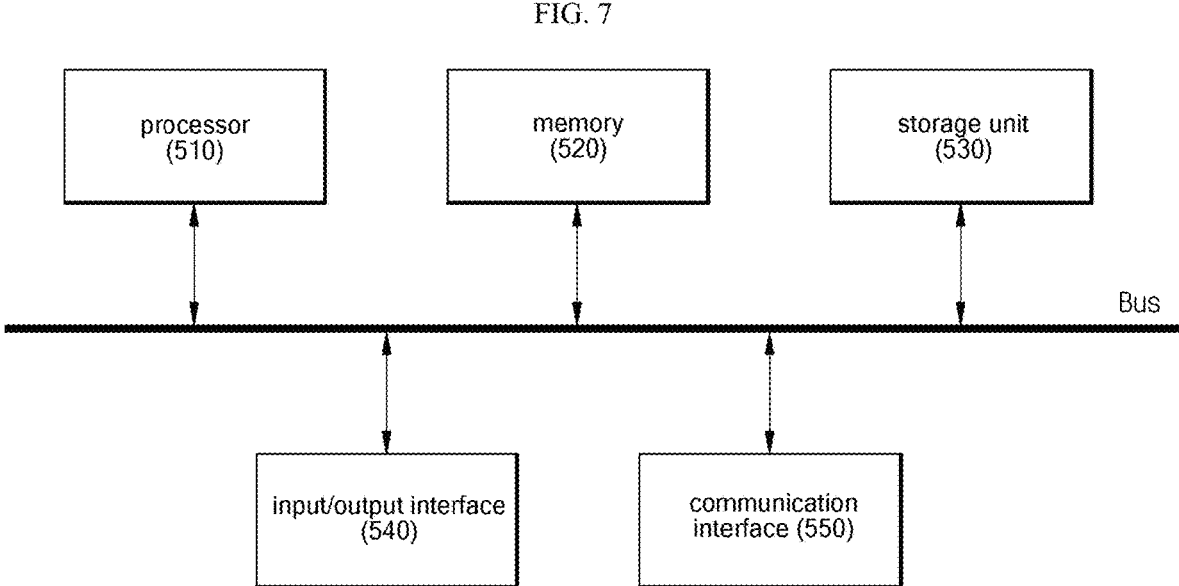
FIG. 7 is an exemplary diagram of a computing device configuration for a server.

FIG. 7 is an exemplary diagram of a computing device configuration for a server. A method performed by a management server may be performed by one or more computing devices for servers, and specifically be performed by one or more processors belonging to computing devices. As shown in FIG. 7, a computing device 500 may include a processor 510, a memory 520, a storage unit 530, an input/output interface 540, and a communication interface 550. The processor 510 may include a central processing unit (CPU), a graphic processing unit (GPU) or a microprocessor including one or more processing cores similar thereto. Memory 520 may store data and programs for execution by processor 510. The memory 520 may include one or more volatile and nonvolatile memories, and may be internal or distributed memories. The storage unit 530 may be for a database and may include non-transitory storages. The storage unit 530 may include at least some of a hard disk drive, a flash memory, an optical disk, a magnetic-optical disk, a universal serial bus (USB) drive, and the like.

The input/output interface 540 may enable a user to provide input and receive output and may include one or more input and/or output devices that send and receive data to and from other computing devices. The input/output interface 540 may be a mouse, keypad or keyboard, camera, optical scanner, network interface, modem, or other known I/O device, and may include a combination thereof. The input/output interface 540 may include at least some of a graphic engine, a display, one or more output drivers (e.g., display driver), one or more audio speakers, and one or more audio drivers. The communication interface 550 may provide one or more interfaces for network communication (e.g., packet-based communication) between the computing device 500 and one or more other computing devices. For example, the communication interface 550 may include a network interface controller (NIC) or a network adapter for communicating with Ethernet or other wired based networks, or a wireless NIC or wireless adapter for communicating over a wireless network, such as Wi-Fi.

Meanwhile, a bus may include hardware, software, or both that connect components of a computing device to each other. For example, a bus may include an accelerated graphics port (AGP) or other graphics bus, an enhanced industry standard architecture (EISA) bus, a front-side bus (FSB), a hypertransport (HT) interconnect, an industry standard architecture (ISA) bus, an INFINIBAND interconnect, a low-pin-count (LPC) bus, a memory bus, a micro channel architecture (MAC) bus, a peripheral component interconnect (PCI) bus, a PCIe (PCI-Express) bus, a serial technology attachment (SATA) bus, a VL (VESA Local, VESA: Video Electronics Standard Association Local) bus, other suitable buses or combinations thereof. The above configurations of FIG. 7 are exemplary, and the computing device may include at least some of the configurations of FIG. 7 and may include other configurations not shown.

So far, the present disclosure has been described focusing on the preferred exemplary embodiments. A person skilled in the art to which the present disclosure pertains will understand that the present disclosure may be implemented in a modified form without departing from the essential characteristics of the present disclosure. Therefore, the disclosed exemplary embodiments should be considered from an illustrative rather than a restrictive perspective. The scope of the present disclosure is shown in the claims, not the above description, and all differences within the scope of equivalents are to be construed as being included in the present disclosure.

The invention claimed is:

1. A supplier virtuous cycle evaluation method based on on-site verification, the method comprising:

executing, by a mobile application on a user's mobile terminal, acquiring store information including a store location, and using hardware resources of the mobile terminal to acquire a locally-readable store identifier from at least one of a QR code, an RFID tag, an NFC tag, or a beacon installed within the store;

determining, by the mobile application, that a current location of the mobile terminal is within a predetermined error range of the store location, and determining that the locally-readable store identifier matches a pre-registered store identifier obtained from a management server, only when both determinations are satisfied, programmatically enabling, by the mobile application, an evaluation user interface on the mobile terminal and granting evaluation authority to the user;

for a scheduled evaluation, granting the user a certain period of time from when evaluation authority is granted to perform the store evaluation, providing the evaluation user interface to the user only within the certain period of time, and paying the reward before the store evaluation and permitting upload of the evaluation results only within the certain period of time;

uploading, by the mobile application, to the management server store evaluation results by the user to whom evaluation authority is granted;

imposing, by the management server, a penalty when the store evaluation results are not uploaded within the certain period of time, wherein the penalty comprises restricting the user's ability to use the evaluation application; and providing, by the management server, a store promotion
  service that makes the uploaded store evaluation results
  publicly available online.

<center>* * * * *</center>